US011768462B2

(12) United States Patent
Mansoor et al.

(10) Patent No.: US 11,768,462 B2
(45) Date of Patent: Sep. 26, 2023

(54) SYSTEMS AND METHODS FOR AN INTEGRATED HOLOGRAPHIC RECONSTRUCTION TOOL WITH OPTICAL DISTORTION REMOVAL AND DE-TWINNING

(71) Applicant: METROLASER, INC., Irvine, CA (US)

(72) Inventors: Mohammad Mansoor, Irvine, CA (US); James Trolinger, Costa Mesa, CA (US); Jacob George, Downey, CA (US)

(73) Assignees: METROLASER, INC., Laguna Hills, CA (US); NAVAIR LAKEHURST, NAVAL AIR WARFARE CENTER AD (LKE), Joint Base MDL, NJ (US)

( * ) Notice: Subject to any disclaimer, the term of this patent is extended or adjusted under 35 U.S.C. 154(b) by 140 days.

(21) Appl. No.: 17/374,670

(22) Filed: Jul. 13, 2021

(65) Prior Publication Data

US 2023/0020038 A1    Jan. 19, 2023

(51) Int. Cl.
*G03H 1/22* (2006.01)
*G06F 3/04847* (2022.01)
*G06T 5/20* (2006.01)
*G06T 3/40* (2006.01)
*G06T 5/00* (2006.01)

(52) U.S. Cl.
CPC ....... *G03H 1/2202* (2013.01); *G06F 3/04847* (2013.01); *G06T 3/4023* (2013.01); *G06T 5/002* (2013.01); *G06T 5/006* (2013.01); *G06T 5/20* (2013.01); *G03H 2001/2247* (2013.01); *G03H 2226/02* (2013.01); *G06T 2200/24* (2013.01); *G06T 2207/20056* (2013.01)

(58) Field of Classification Search
None
See application file for complete search history.

(56) References Cited

U.S. PATENT DOCUMENTS

| | | | | |
|---|---|---|---|---|
| 2015/0277377 A1* | 10/2015 | Tsang | ............ | G03H 1/0841 348/40 |
| 2017/0168285 A1* | 6/2017 | Ozcan | ............ | G02B 21/0056 |
| 2018/0188686 A1* | 7/2018 | Park | ............ | G03H 1/0866 |
| 2019/0277935 A1* | 9/2019 | Zeng | ............ | G06N 3/045 |

\* cited by examiner

*Primary Examiner* — James A Thompson
(74) *Attorney, Agent, or Firm* — Haynes and Boone, LLP (57) ABSTRACT

Embodiments described herein provide an integrated holographic reconstruction platform that enables a user to perform three-dimensional visualization of a phenomenon by reconstructing holograms using a combination of normalization and propagation algorithms, which yields better results with significantly less demanding processing time and computing resources. Specifically, the integrated holographic reconstruction platform may be implemented as an all-in-one computer software that includes software components of digital holographic reconstruction, de-twinning and optical distortion removal via a user-friendly graphical interface.

20 Claims, 11 Drawing Sheets

SYSTEMS AND METHODS FOR AN INTEGRATED HOLOGRAPHIC RECONSTRUCTION TOOL WITH OPTICAL DISTORTION REMOVAL AND DE-TWINNING

STATEMENT REGARDING GOVERNMENT SUPPORT

This invention was made under government support under a Phase I STTR contract entitled "Non-intrusive Diagnostics to Quantify Interactions between High-speed Flows and Hydrometeors," Contract N683352000428. The government has certain rights in the invention.

TECHNICAL FIELD

The embodiments relate generally to holographic reconstruction systems, and more specifically to an integrated holographic reconstruction tool with optical distortion removal and de-twinning.

BACKGROUND

A hologram is usually a three-dimensional image that depicts optical and/or reflective characteristics of the surface of an object, formed by the interference of light beams from a laser or other coherent light source. For example, a light beam may be projected onto the surface of the object, and an object beam reflected from the object interferes with a reference beam when both the beams reach a photographic plate. The superposition of these two beams produces an interference pattern (in the form of dark and bright fringes) and this pattern can be recorded on the photographic plate to form the hologram.

As each and every part of the hologram receives light from various points of the object, the hologram, or any part of it can be used to reconstruct an image of the object. For example, a laser beam that is identical to the reference beam used in construction of the hologram is used to illuminate the hologram, which undergoes diffraction during passage through the hologram to produce an image of the object. During the reconstruction process, multiple factors can affect the accuracy of the reconstructed image. For example, an unwanted "twin" image is often generated during the reconstruction process, which obscures the accuracy of the reconstruction. For another example, optical distortion due to lens aberrations can often result in a distorted wavefront that is captured in holograms.

Therefore, it remains challenging to produce accurate holographic reconstruction.

DETAILED DESCRIPTION

Existing holography methods do not have the ability to process, reconstruct, de-twin and undistort digital holograms in a single software package. These processes are often difficult to implement and optimize and require a high degree of computational resources. For example, existing software packages for holography, such as ZEMAX® or other products implemented by programming codes such as C, C++, Python, and Java, generally cannot de-twin and optimize reconstructions, because the implementation of numerical algorithms to perform simple reconstruction tasks is computationally consuming.

In view of the deficiency of current holography products, embodiments described herein provide an integrated holographic reconstruction platform that enables a user to perform three-dimensional visualization of a phenomenon by reconstructing holograms using a combination of normalization and propagation algorithms, which yields better results in significantly less demanding processing time and computing resources. Specifically, the integrated holographic reconstruction platform may be implemented as an all-in-one computer software that includes software components of digital holographic reconstruction, de-twinning and optical distortion removal via a user-friendly graphical interface.

For example, due to symmetric reasons, holographic reconstruction can include two images: the first being a real, orthoscopic image of the object and the second being a virtual, pseudoscopic image of the object, also known as the twin image. The real image is out of focus in the twin-image plane and the twin image is out of focus in the real image plane. The twin image can obscure and add noise to the reconstruction which limits the information that can be extracted from a holographic record. Embodiments provided herein provide de-twinning on the fly with the reconstruction process.

For another example, lens aberrations may often create a distorted wavefront that is captured in holograms. The integrated holographic reconstruction module described herein corrects for distortion aberrations by correcting the actual wavefront using a calibration process. This allows an inexpensive, aberrated lens to perform the function of a diffraction limited lens of the same diameter when calibration correction is applied. Specifically, a testing hologram of a fixed frequency grid distortion target containing at least ten dot points spanning the field-of-view may be captured. A larger number of dot points will result in a better distortion calibration. The dot-pattern is digitally reconstructed from the hologram and the position of the dots is detected by the software. The dot positions obtained are then compared with the fiducial to map the optical distortion in the lens-system and correct the hologram reconstructions accordingly.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1A:
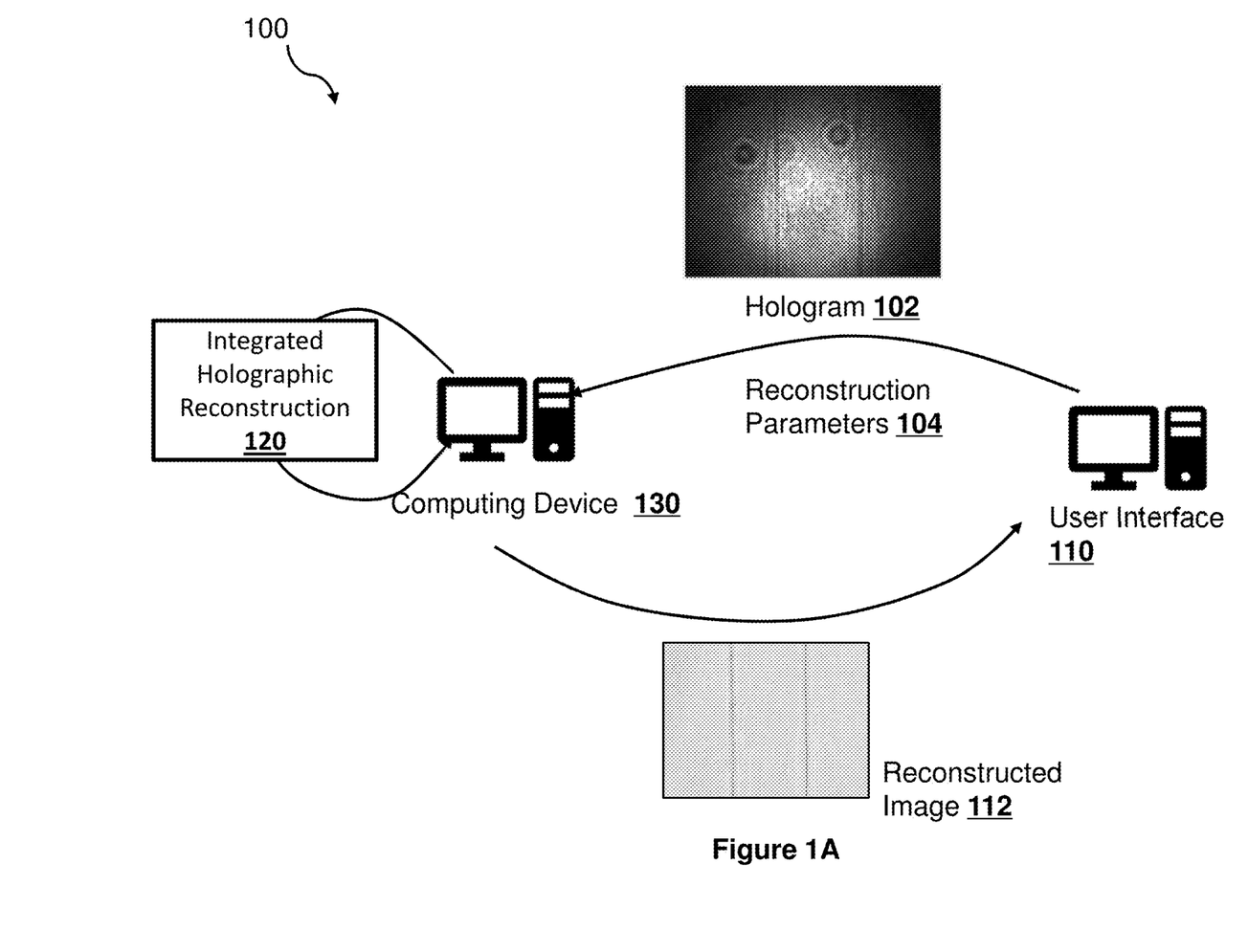
FIG. 1A is a simplified diagram illustrating a computing device implementing the integrated holographic reconstruction module and interacting with other computing components such as a user interface, according to embodiments described herein.

FIG. 1A is a simplified diagram 100 illustrating a computing device implementing the integrated holographic reconstruction module and interacting with other computing components such as a user interface, according to embodiments described herein. Diagram 100 shows a computing device 130 that interacts with a user interface 110 to exchange data relating to holographic reconstruction. In one implementation, the user interface 110 may be integrated with the computing device 130. In another implementation, the user interface 110 may be remote to the computing device 130, e.g., the computing device 130 may be housed at a remote server while the user interface 110 may be located with a local user device.

Figure 3A:
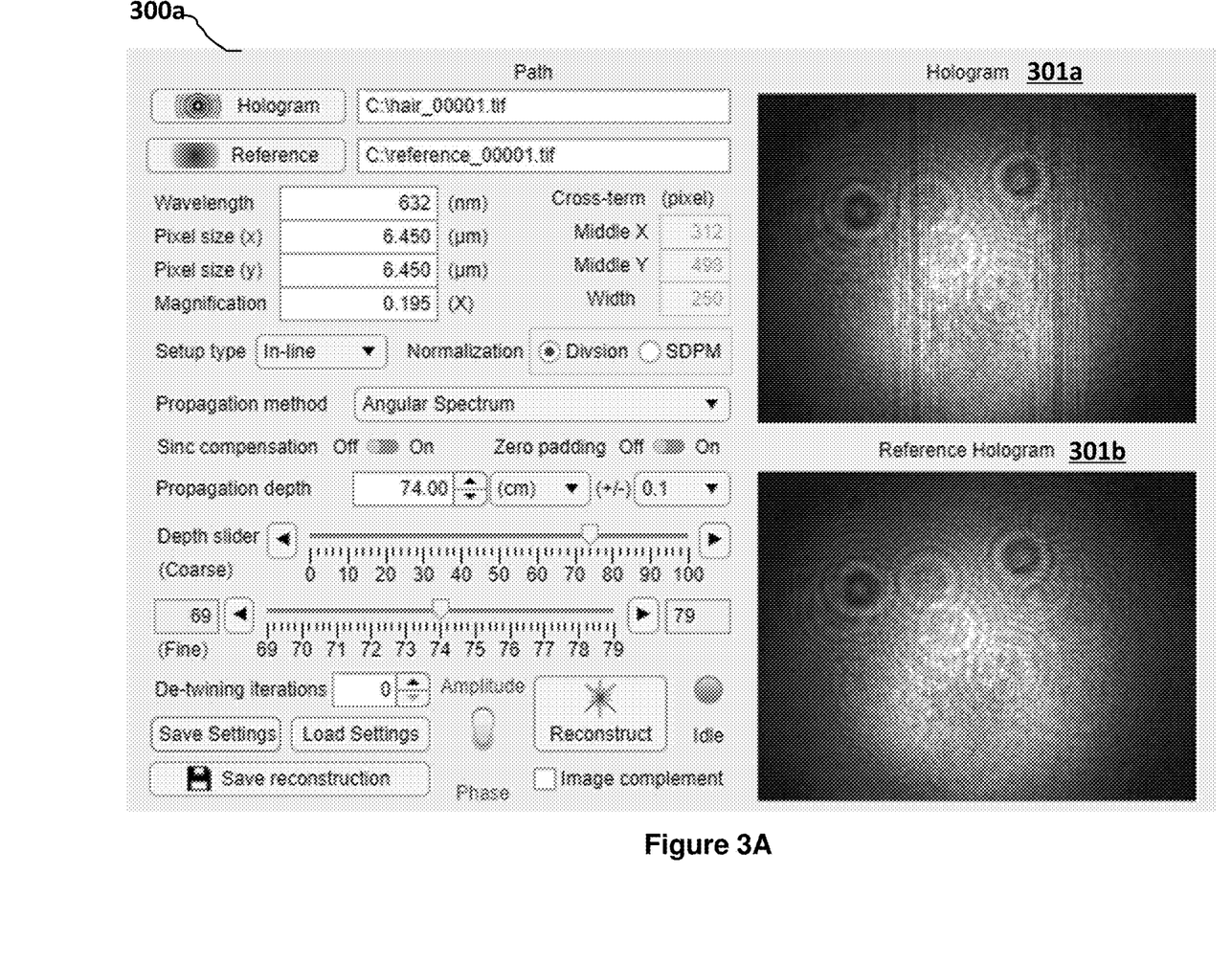
FIGS. 3A-3B are simplified diagrams illustrating an example user interface (UI) of the integrated holographic reconstruction module described in FIGS. 1A-1B, according to embodiments described herein.
Figure 3B:
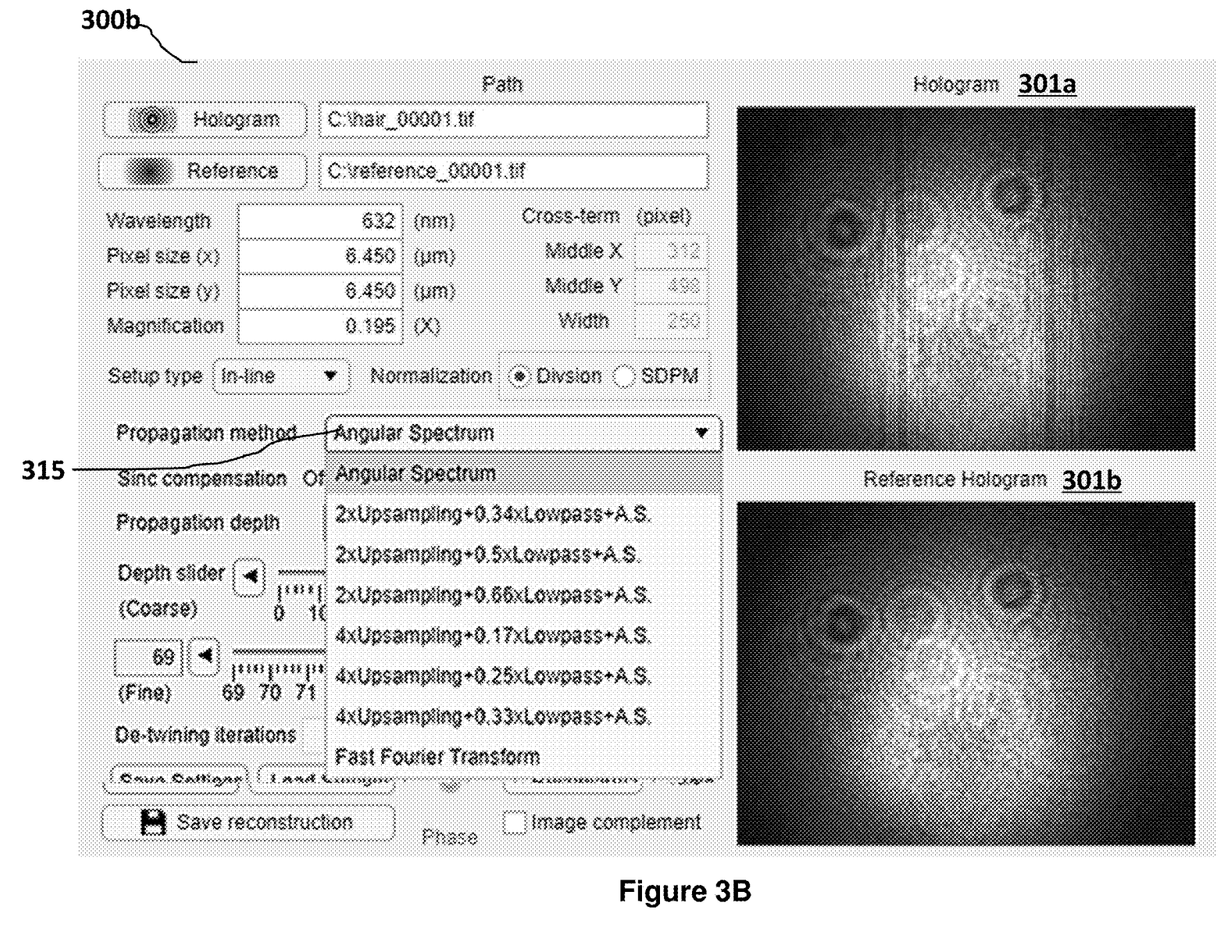
Figure 6:
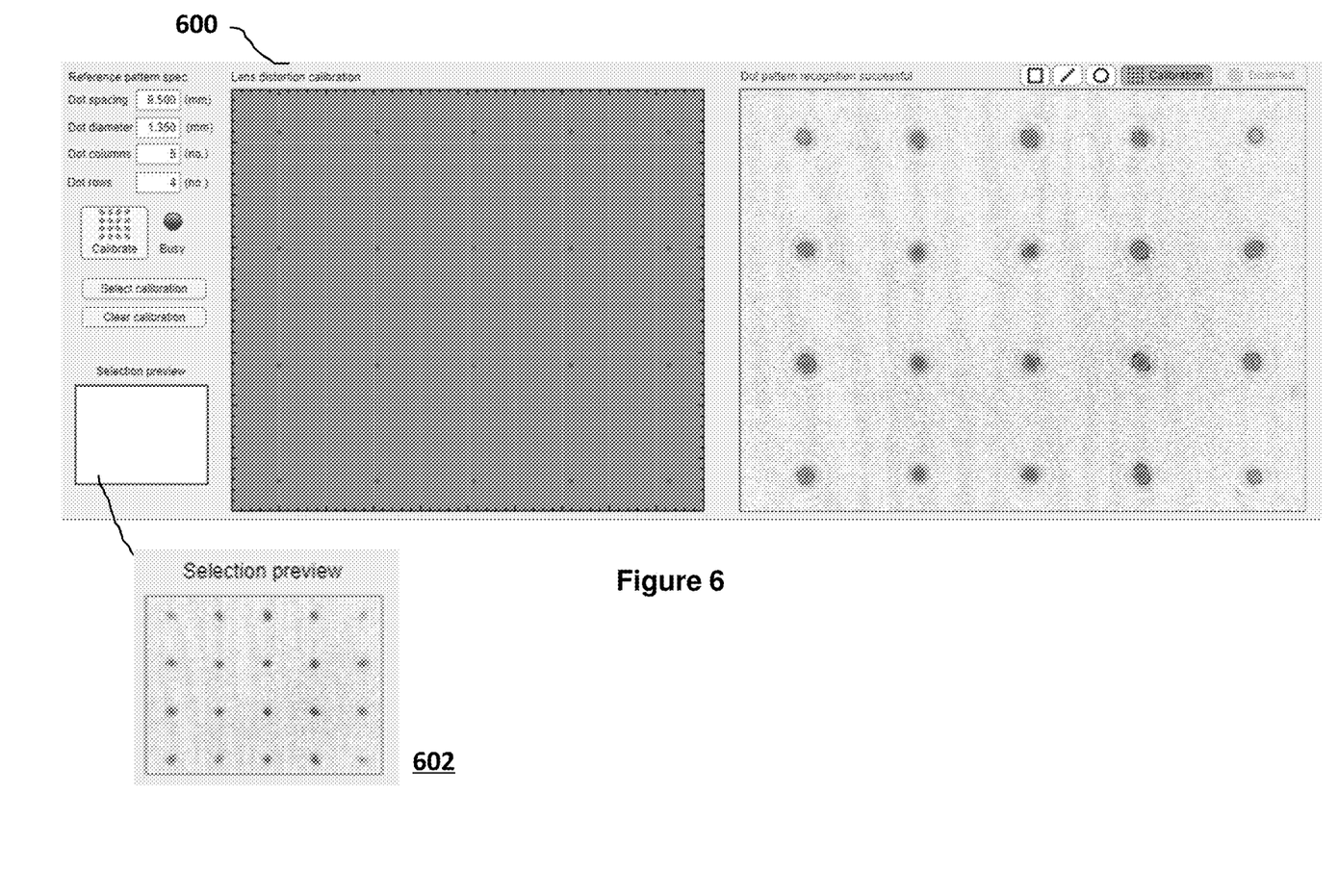
FIG. 6 is a simplified diagram illustrating an example UI of using a testing hologram of a fiducial dot-pattern to calibrate optical distortion, according to embodiments described herein.

In one embodiment, the computing device 130 may be implemented with an integrated holographic reconstruction module 120, which may take the form of a software package that provides an all-in-one solution for digital holographic reconstruction, de-twinning, and optical distortion removal in a user-friendly graphical interface provided via the user interface 110. The user interface 110 may receive and/or upload one or more holograms 102 and reconstruction parameters 104 to the computing device 130. An example user interface 110 is illustrated in FIGS. 3A-3B and 6.

The integrated holographic reconstruction module 120 may be configured with the received reconstruction parameters 104 and process the received hologram(s) 102. For example, the holograms 102 may include both, in-line and off-axes schemes, and the integrated holographic reconstruction module 120 is configured with the option to locate and specify the cross-term in the latter case. The module 120 is also configured to enable the calculation of intensity and phase distributions at different distances from the digital sensor using multiple functionalities of propagation and normalization to optimize holographic reconstructions, as further described in relation to FIGS. 2A-2B.

In one embodiment, the integrated holographic reconstruction module 120 may provide a reconstructed image 112 via the user interface 110.

Figure 1B:
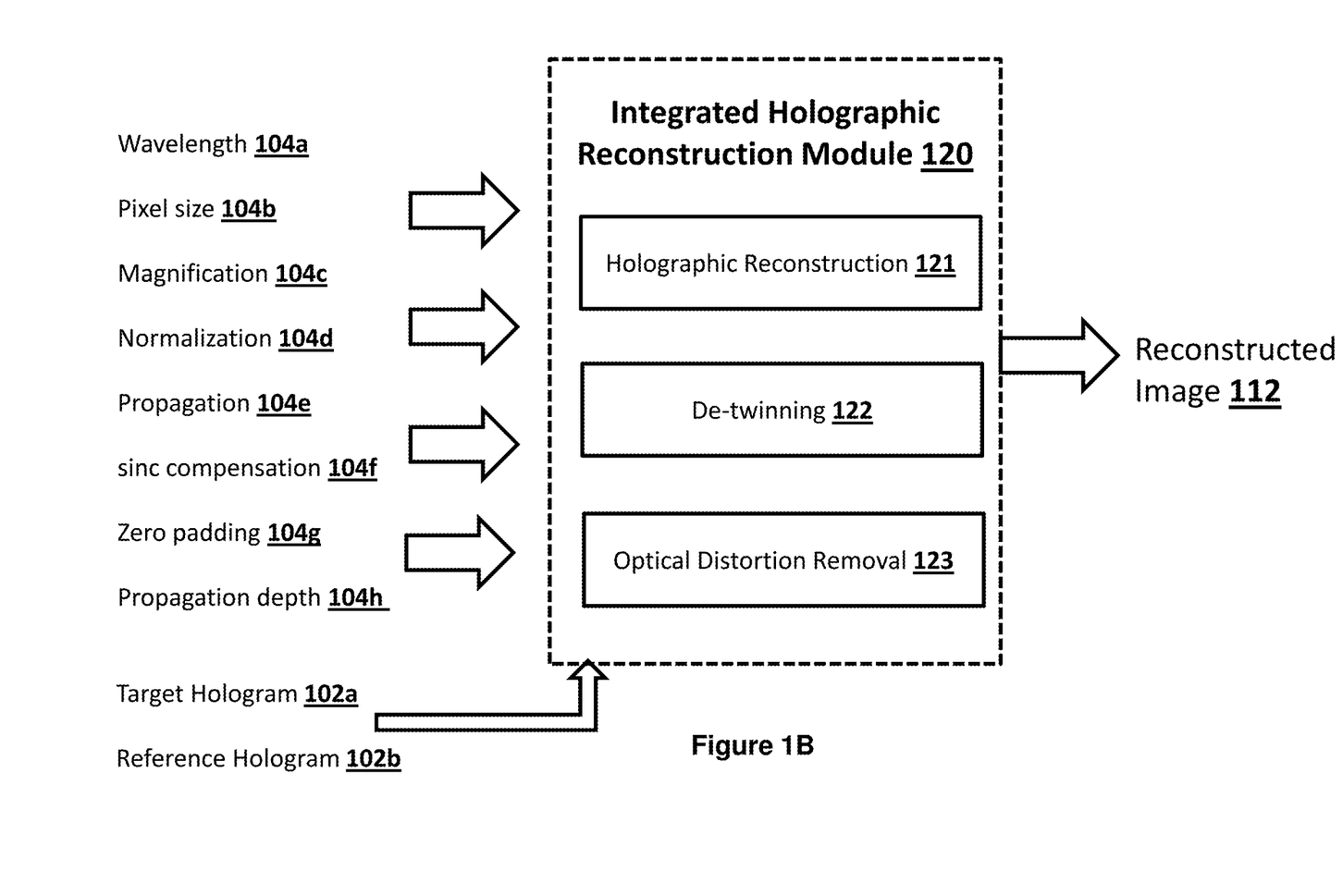
FIG. 1B is a simplified diagram illustrating the input to and the output from the integrated holographic reconstruction module described in FIG. 1A and its sub-modules, according to embodiments described herein.

FIG. 1B is a simplified diagram illustrating the input to and the output from the integrated holographic reconstruction module described in FIG. 1A and its sub-modules, according to embodiments described herein. The integrated holographic reconstruction module 120 may include software components of a holographic reconstruction 121, a de-twinning component 122 and an optical distortion removal component 123. In this way, the integrated holographic reconstruction module 120 provides all functionalities of reconstruction, de-twinning and distortion removal in one single software package.

For example, the integrated holographic reconstruction module 120 may receive reconstruction parameters 104 configured through the user interface 110, including a wavelength parameter 104a, a pixel size parameter 104b, a magnification parameter 104c, a normalization type 104d, a propagation method 104e, a sinc compensation parameter 104f, a zero-padding parameter 104g, a propagation depth parameter 104h, and/or the like.

For example, the normalization type 104d may be a division normalization procedure, or a subtraction division plus mean (SDPM) procedure. The SDPM procedure may be implemented by subtracting the reference beam hologram from the target hologram, and dividing a result from the subtraction by the reference beam hologram plus a mean value of the reference beam hologram.

For another example, the propagation method 104e includes at least one of angular spectrum, up-sampling and low-pass filtering, fast Fourier transforms, and/or any combination thereof. Specifically, in the angular spectrum mode, the optical field is described as a superposition of plane waves and evanescent waves which are physically intuitive solutions of Maxwell's equations.

The up-sampling and low-pass filtering option may include conducting an up-sampling process by filling gaps between measured pixels with zeros before propagation. An up-sampling process is employed before propagation to overcome pixel-size limitations. The up-sampling is realized by filling the gaps between measured pixels with zeros. For the case of diverging illumination, the up-sampling yields significantly higher resolution than the pixel size would normally allow. A low-pass filter is then applied after the up-sampling process. Two parameters can be chosen: the up-sampling-factor and the low-pass-factor. The up-sampling-factor indicates the factor by which the size of the image is increased during the up-sampling process. A factor of 2 indicates that each second pixel has a zero value in both directions in the up-sampled image. Hence the total number of pixels is increased four times. The low-pass factor is set relative to the size of the up-sampled image. For a factor of 0.5, the low-pass window in frequency space has half of the total size of the Fast Fourier Transform. The low-pass values that can be chosen in the reconstruction are 0.34, 0.5 and 0.66 for the 2×2 up-sampling process and 0.17, 0.25 and 0.33 for the 4×4 up-sampling process. This means that the potential reconstruction resolution can be improved by a factor of up to 1.33 at the cost of additional artifacts or decreased by a factor of 0.68 at the benefit of removing artifacts.

The fast Fourier Transform method transforms a hologram from spatial to frequency domain. This feature is used to locate the (X,Y) center location and width of the cross-term in off-axis holography setups.

In one implementation, the three different functionalities of propagation methods may be implemented from a choice of eight different combinations.

For another example, for the "Sinc compensation" 104f, if turned on, the wave field is sinc-interpolated before it is propagated, and the additional sinc-interpolation process yields less pixelated results.

For another example, for the "Zero padding" 104g, if turned on, the hologram is zero-padded before the actual propagation. This avoids calculation errors related to diverging parts of the wave field which otherwise propagate back into the field-of-view from the side.

For another example, the propagation depth 104h refers to the distance from the reconstruction plane to the detector plane. For a lens-less system, this is the distance between the object and the digital sensor. For a lens system, the propagation distance from the detector is relative to the image plane that is be determined using the lens equation first.

The integrated holographic reconstruction module 120 may further receive a target hologram 102a of an object and a reference hologram 102b uploaded by the user through user interface 110. The example UI is provided in FIGS. 3A-3B. The integrated holographic reconstruction module 120 may output a reconstructed image 112. Details of the functionalities of the integrated holographic reconstruction module 120 and its sub-modules 121-123 for generating the reconstructed image 112 are described below in relation to FIGS. 2A-2B.

Figure 2A:
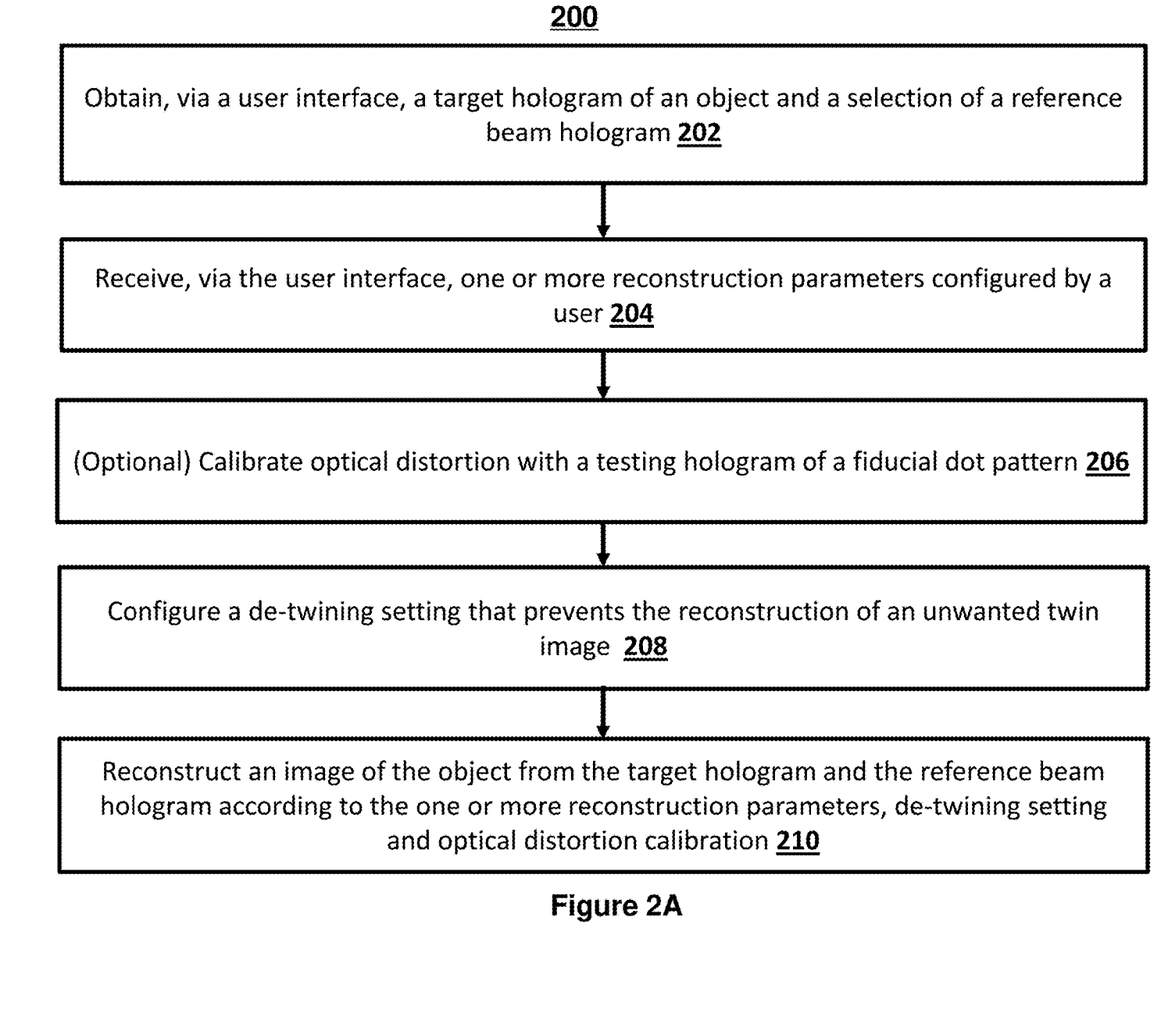
FIG. 2A is a simplified logic flow diagram illustrating a method of operating the integrated holographic reconstruction module described in FIGS. 1A-1B to reconstruct an image of an object from a hologram of the object, according to embodiments described herein.

FIG. 2A is a simplified logic flow diagram illustrating a method 200 of operating the integrated holographic reconstruction module described in FIGS. 1A-1B to reconstruct an image of an object from a hologram of the object, according to embodiments described herein. One or more of the processes 202-210 of method 200 may be implemented, at least in part, in the form of executable code stored on non-transitory, tangible, machine-readable media that when run by one or more processors may cause the one or more processors to perform one or more of the processes 202-210.

At step 202, a target hologram of an object and a selection of a reference beam hologram may be obtained via a user interface. For example, as shown in FIG. 3A, a hologram 301a and a reference hologram 301b may be selected and uploaded via the user interface. The holograms may take a format of a "tif", "tiff", "png", "bmp", "jpeg" and "jpg" files.

At step 204, one or more reconstruction parameters may be configured by a user via the user interface. For example, the one or more reconstruction parameters include parameters 104a-h described in FIG. 1B.

At step 206, theoptical distortion may be optionally calibrated with a testing hologram of a fiducial dot-pattern. A focused dot-pattern image is reconstructed using a propagation depth adjustment. Dot recognition is then used to obtain dot positions, which are then compared with the fiducial specifications to calibrate optical distortion. The calibration may be conducted constantly, periodically or on an on-demand basis. Further details of the calibration to remove optical distortion may be described in FIG. 2B.

At step 208, a de-twinning setting may be configured, which prevents the reconstruction of an unwanted twin image. In one implementation, the de-twinning module 122 is configured to iteratively update a complex-valued wavefront in a detector plane during reconstruction. The de-twinning iterations may be configured via the user interface, e.g., from 0 to 5. In another implementation, a statistical division parametric mapping (SDPM) procedure may be configured for normalization, which facilitates the de-twinning objective.

In one implementation, step 208 may be performed in response to reconstructing a first image and a second image from the target hologram and the reference beam hologram according to the one or more reconstruction parameters, wherein the first image and the second image are each out of focus in a respective image plane of the other image. In one implementation, step 208 may be automatically performed constantly, periodically, or on an on-demand basis during the reconstruction process.

At step 210, an image of the object is reconstructed from the target hologram and the reference beam hologram according to the one or more reconstruction parameters and the de-twinning setting.

Figure 2B:
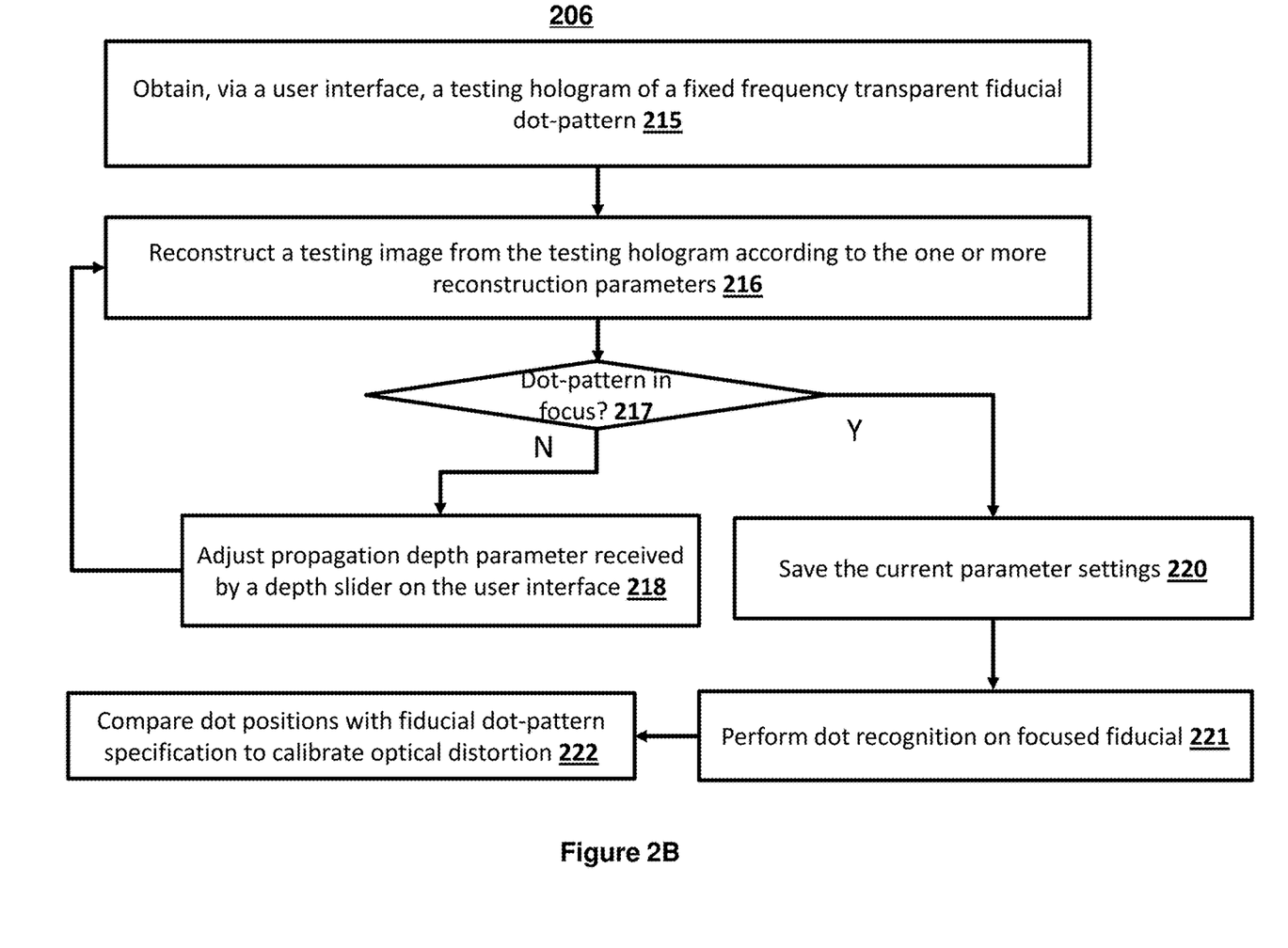
FIG. 2B is a simplified logic flow diagram illustrating a method of calibrating optical distortion with a testing hologram of a fiducial dot-pattern as described in FIG. 2A, according to embodiments described herein.

FIG. 2B is a simplified logic flow diagram illustrating a method 206 of calibrating holographic reconstruction parameters with a testing hologram as described in FIG. 2A, according to embodiments described herein. One or more of the processes 215-222 of method 206 may be implemented, at least in part, in the form of executable code stored on non-transitory, tangible, machine-readable media that when run by one or more processors may cause the one or more processors to perform one or more of the processes 215-222.

At step 215, a testing hologram of a fixed frequency transparent fiducial dot-pattern may be obtained via the user interface.

At step 216, a testing image is reconstructed from the testing hologram according to the one or more reconstruction parameters.

At step 217, it is determined whether the dot-pattern is in focus (e.g., within a focus threshold) in the resulting testing image. For example, a user may review the resulting testing image via the user interface and decide whether to continue calibration.

At step 218, when the dot-pattern is not in focus yet, the propagation depth parameter may be adjusted, e.g., by a depth slider on the user interface.

At step 220, if the dot-pattern is in focus, the current parameter settings may be saved. In this way, process 206 iteratively re-generates the testing image based on a progressively adjusted propagation depth parameter received by a depth slider on the user interface until a dot pattern on the testing image comes into focus.

At step 221, the focused dot pattern is processed to recognize and locate the position of all dots in the image.

At step 222, the dot positions obtained are compared with the fiducial to map the optical distortion in the lens-system and undistort the hologram reconstructions accordingly.

FIGS. 3A-3B are simplified diagrams illustrating an example user interface (UI) of the integrated holographic reconstruction module described in FIGS. 1A-1B, according to embodiments described herein. As shown in FIG. 3A, a software UI 300a of the integrated hologram reconstruction module 120 may be used to upload and process holograms (e.g., 301a-b), save reconstructions as well as load or save reconstruction settings such as reconstruction parameters 104a-h. For example, UI 300a includes various UI widgets, such as drop-down list for choosing a propagation method, a coarse depth slider and a fine depth slider for configuring a propagation depth parameter, a de-twinning iteration counter for configuring a de-twinning iteration number, and/or the like. A user may then scan the depth-of-field and determine the three-dimensional location of reconstructed objects. The quality of holograms provided in terms of pixel resolution, pixel size and number of interference fringes determine the lateral resolution achieved by the software.

In one implementation, the integrated holographic reconstruction module 120 allows the implementation of several different normalization and propagation methods to perform a single reconstruction. For example, as shown in FIG. 3B, the drop-down list 315 for choosing a propagation method may include options for angular spectrum, various up-sampling and low-pass filtering with different coefficients, and fast Fourier Transform. The user determines the best possible combination depending on the type of hologram being processed. As an example, an in-line hologram of two hair strands, e.g., 301a, and its reference hologram 301b may be uploaded via software UIs 300a-b.

In one implementation, the angular spectrum method can be combined with up-sampling and low-pass filtering to yield better resolution or less noise. For example, the potential resolution may be decreased at the benefit of removing noise by setting Normalization type 104d to "SDPM" in reference settings and setting propagation method 104e to "2×Upsampling+0.34×Lowpass+A.S." in reference settings. For another example, the potential resolution may be increased at the expense of adding noise by setting normalization type 104d to "SDPM" in reference settings and setting propagation method 104e to "2×Upsampling+0.66×Lowpass+A.S." in reference settings.

An example operation of the reconstruction process via software UI 300a-b may include the following actions: selecting the "Hologram" button to select the hologram to upload and process; selecting the "Reference" button to select the reference beam hologram to upload and process; receiving a user configuration of illumination source "Wavelength"; receiving a user configured digital sensor length "Pixel size(x)" and height "Pixel size(y)"; receiving a user configured system "Magnification"; receiving a user selection of "Setup type" from dropdown list (which accepts holograms for both, in-line and off-axes schemes with the option to locate and specify the cross-term in the latter case); receiving, through the radio buttons labeled "Normalization" a user selection between two types of normalization routines: "Division" or "SDPM" normalization; receiving a user selection of "Propagation method" from dropdown list; receiving a user selection for "Sinc compensation"; receiving a user selection for "Zero padding"; receiving a user configuration value for "Propagation depth" via the spinner control; and receiving a reconstruction command via the "Reconstruct" button.

In one implementation, the software UI 300a may receive an adjustment to the propagation depth using "Coarse" depth slider or fine adjustments using "Fine" depth slider. Reconstruction can be saved using the "Save reconstruction" button, and settings can be saved using the "Save settings" button.

Figure 4A:
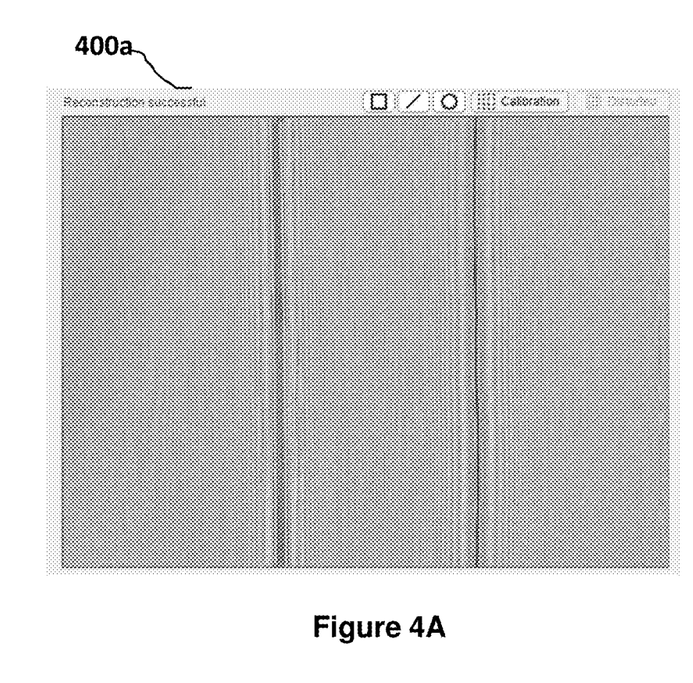
FIG. 4A is a simplified diagram illustrating example reconstructed images of two hair strands before the de-twinning process, according to embodiments described herein.

FIG. 4A is a simplified diagram illustrating an example reconstructed image 400a of two hair strands before the de-twinning process, according to embodiments described herein. The beam profile has not been spatially filtered since the software can compensate for background noise if the reference beam hologram is provided. The reconstructed image 400a contains discernable fringes around the visuals of each strand of hair.

Figure 4B:
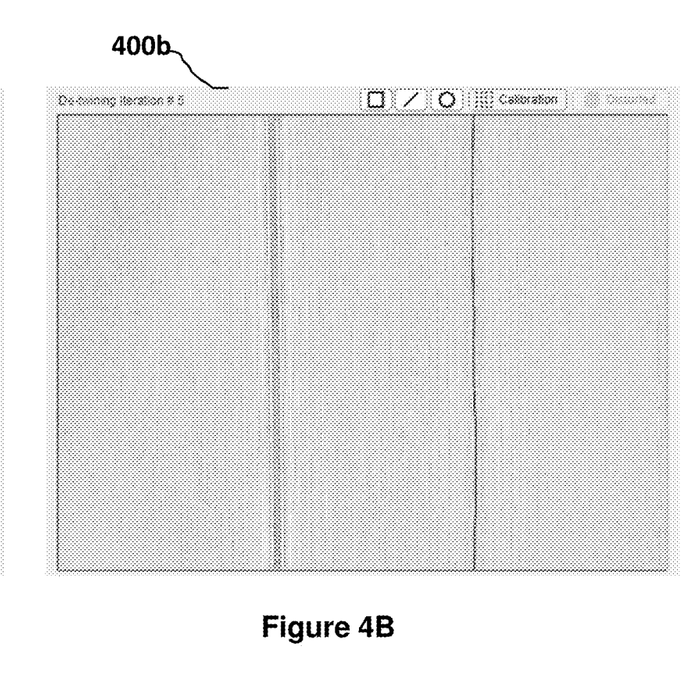
FIGS. 4B-4C are simplified diagrams illustrating example reconstructed images of two hair strands after each implementing a different type of de-twinning process, respectively, according to embodiments described herein.
Figure 4C:
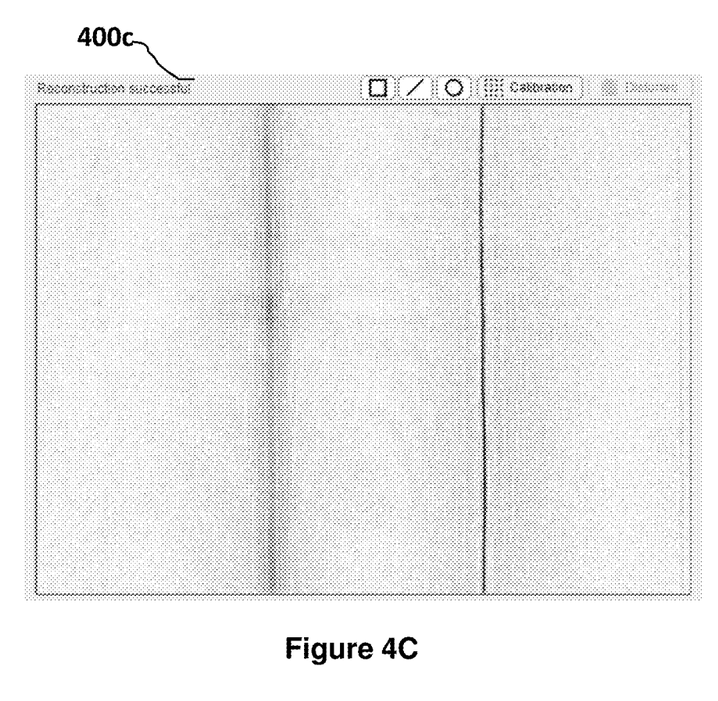

FIGS. 4B-4C are simplified diagrams illustrating example reconstructed images 400b and 400c of two hair strands after each implementing a different type of de-twinning process, respectively, according to embodiments described herein. Specifically, image 400b in FIG. 4B is obtained by iteratively updating the complex-valued wavefront in the detector plane for a de-twinning iteration of 5. Image 400c in FIG. 4C is obtained by setting a normalization type as SPDM, which requires less processing time compared to that of image 400b. In both FIG. 4B and 4C, images 400b and 400c show that fringes around hair reconstruction from an out-of-focus virtual have been suppressed after the de-twinning process, compared to image 400a.

Figure 5A:
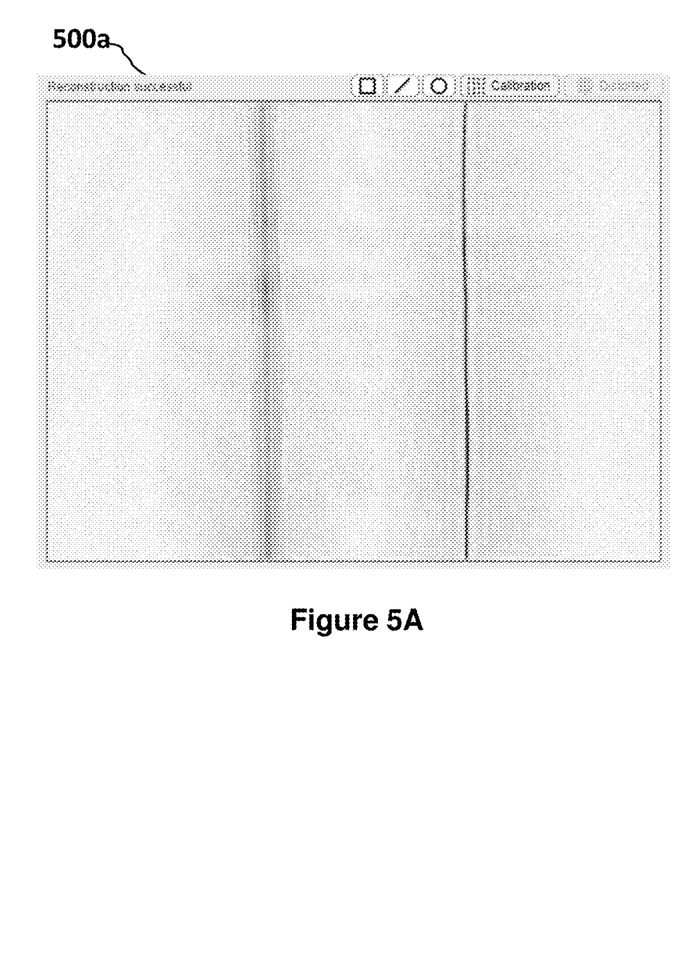
FIGS. 5A-5B are simplified diagrams illustrating example reconstructed images of two hair strands under different combination of propagation methods, respectively, according to embodiments described herein.
Figure 5B:
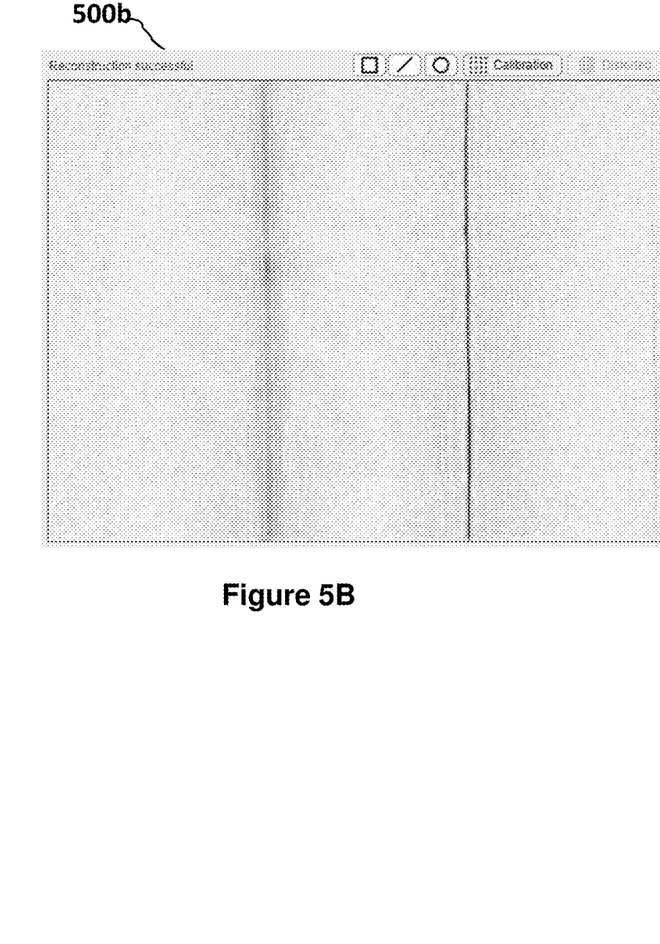

FIGS. 5A-5B are simplified diagrams illustrating example reconstructed images 500a and 500b of two hair strands under different combination of propagation methods, respectively, according to embodiments described herein. Image 500a in FIG. 5A may be obtained by decreasing the potential resolution at the benefit of removing noise, e.g., by setting Normalization type 104d to "SDPM" in reference settings and setting propagation method 104e to "2×Upsampling+0.34×Lowpass+A.S." in reference settings. Image 500b may be obtained by increasing the potential resolution at the expense of adding noise, e.g., by setting normalization type 104d to "SDPM" in reference settings and setting propagation method 104e to "2×Upsampling+0.66×Lowpass+A.S." in reference settings.

FIG. 6 is a simplified diagram illustrating an example UI 600 of using a testing hologram to implement optical distortion removal, according to embodiments described herein. An example operation of UI 600 for the calibration of optical distortion in a lens system may include: receiving a user upload of a testing hologram of a fixed frequency transparent fiducial dot-pattern; receiving a user configuration of the illumination source "Wavelength", digital sensor length "Pixel size(x)" and height "Pixel size(y)", system "Magnification"; receiving a user selection of "Setup type", "Propagation method" and "Normalization"; receiving a user configuration of "Propagation depth"; and a user command to reconstruct by clicking "Reconstruct" button.

The UI 600 may further receive an adjusted configuration of propagation depth using "Coarse" depth slider until the dot pattern comes into focus, e.g., within a focus threshold. Fine adjustments may be made using "Fine" depth slider until dot pattern is sharply reconstructed. The UI 600 may receive a calibration command by clicking on "Calibration" button, and user configuration of "Dot spacing," "Dot diameter" on fiducial target, the number of "Dot columns" captured in fiducial hologram and the number of "Dot rows" captured in fiducial hologram. In one implementation, the accuracy of calibration depends on the accuracy of user provided values for system magnification, dot spacing, dot diameter, dot columns and dot rows for all dots in view to be detected.

The UI 600 may receive a command of "Calibrate" which recognizes the dots in the focused dot-pattern reconstruction and compares the location of these dots with fiducial specifications to calibrate optical distortion in the hologram.

The UI 600 may receive a command of "Select calibration" which populates the "Selection preview" window with a preview 602 of current calibration. The selected calibration can be used to undistort reconstructions. For example, optical distortion from hair strand reconstructions shown in FIG. 4A may be removed.

After calibration, a user may go back to the UI 300a in FIG. 3A to reconstruct a target hologram and remove optical distortion.

Figure 7:
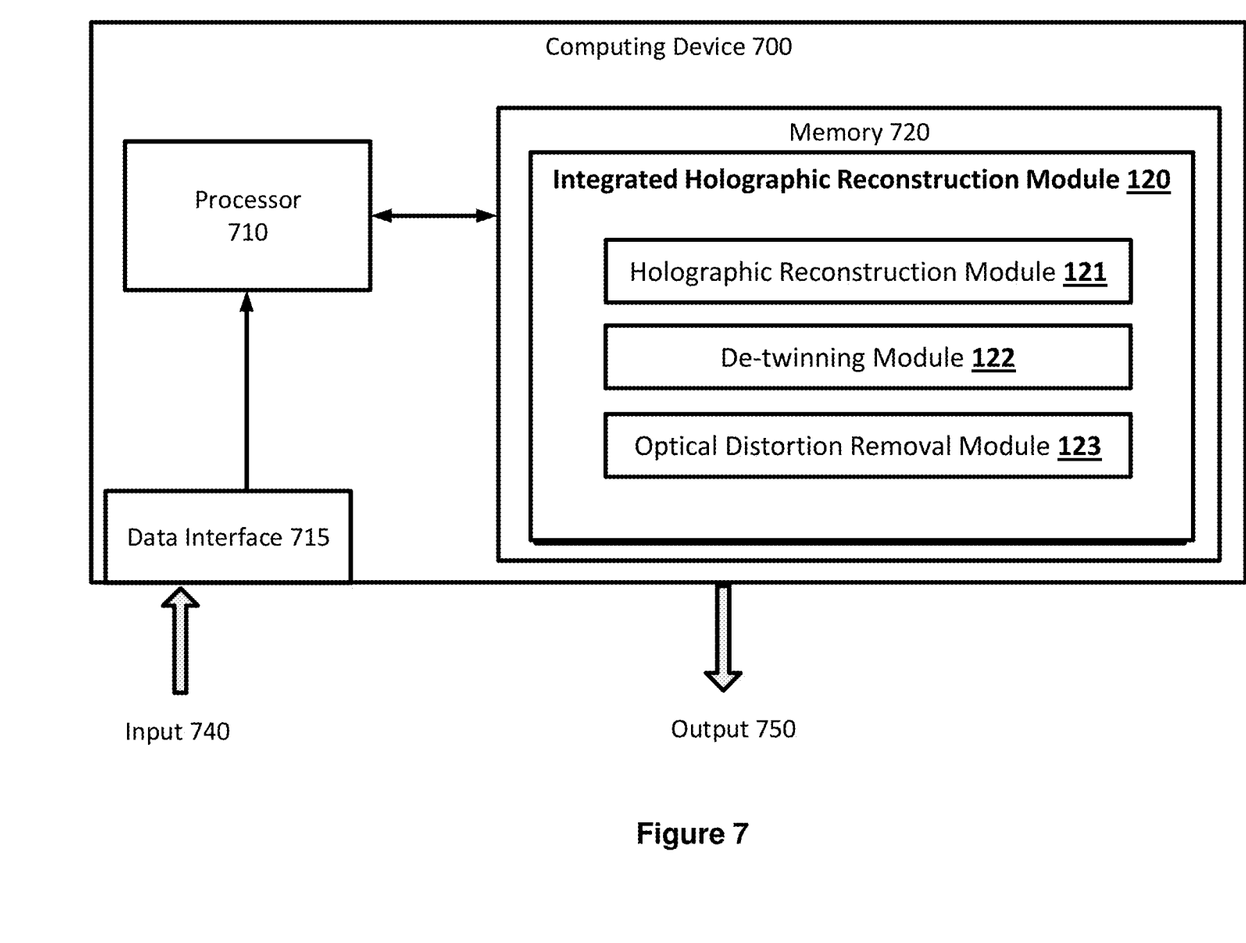
FIG. 7 is a simplified diagram of a computing device that implements the integrated holographic reconstruction module, according to some embodiments described herein. In the figures, elements having the same designations have the same or similar functions.

FIG. 7 is a simplified diagram of a computing device 700 that implements the integrated holographic reconstruction module, according to some embodiments described herein. As shown in FIG. 7, computing device 700 includes a processor 710 coupled to a memory 720. Operation of computing device 700 is controlled by processor 710. And although computing device 700 is shown with only one processor 710, it is understood that processor 710 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 700. Computing device 700 may be implemented as a stand-alone subsystem, as a board added to a computing device, and/or as a virtual machine.

Memory 720 may be used to store software executed by computing device 700 and/or one or more data structures used during operation of computing device 700. Memory 720 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 710 and/or memory 720 may be arranged in any suitable physical arrangement. In some embodiments, processor 710 and/or memory 720 may be implemented on a same board, in a same package (e.g., system-in-package), on a same chip (e.g., system-on-chip), and/or the like. In some embodiments, processor 710 and/or memory 720 may include distributed, virtualized, and/or containerized computing resources. Consistent with such embodiments, processor 710 and/or memory 720 may be located in one or more data centers and/or cloud computing facilities.

In some examples, memory 720 may include non-transitory, tangible, machine readable media that includes executable code that when run by one or more processors (e.g., processor 710) may cause the one or more processors to perform the methods described in further detail herein. For example, as shown, memory 720 includes instructions for an integrated holographic reconstruction module 120 that may be used to implement and/or emulate the systems and models, and/or to implement any of the methods described further herein. In some examples, the integrated holographic reconstruction module 120, may receive an input 740, e.g., such as an object hologram, a reference hologram, a testing hologram and/or the like, via a data interface 715. The data interface 715 may be any of a user interface that takes a similar form as shown in FIGS. 3A-3B and 6. The integrated holographic reconstruction module 120 may generate an output 750, such as the reconstructed image of the object.

In some embodiments, the integrated holographic reconstruction module 120 may further include the holographic reconstruction module 121, the de-twinning module 122, and the optical distortion removal module 123. In some examples, the integrated holographic reconstruction module 120 and the sub-modules 121-123 may be implemented using hardware, software, and/or a combination of hardware and software.

Some examples of computing devices, such as computing device 700 may include non-transitory, tangible, machine readable media that include executable code that when run by one or more processors (e.g., processor 710) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for reconstructing an image of an object from a hologram of the object, the method comprising:
   obtaining, via a user interface, a target hologram of an object and a selection of a reference beam hologram;
   receiving, via the user interface, one or more reconstruction parameters configured by a user, wherein the one or more reconstruction parameters include a normalization type,
   wherein the normalization type includes a subtraction division plus mean (SDPM) procedure including subtracting the reference beam hologram from the target hologram and dividing a result from the subtraction by the reference beam hologram plus a mean value of the reference beam hologram;
   configuring a de-twinning setting that includes iteratively updating a complex-valued wavefront in a detector plane during reconstruction; and
   reconstructing an image of the object from the target hologram and the reference beam hologram according to the one or more reconstruction parameters and the de-twinning setting.

2. The method of claim 1, wherein the one or more reconstruction parameters further include any combination of:
   a wavelength parameter;
   a pixel size parameter;
   a magnification parameter;
   a propagation mode;
   a sinc compensation mode;
   a zero padding mode; and
   a propagation depth parameter.

3. The method of claim 2, wherein the propagation mode includes at least one of:
angular spectrum;
up-sampling and low-pass filtering;
fast Fourier transforms; or
any combination thereof.

4. The method of claim 3, wherein the up-sampling and low-pass filtering further comprises:
conducting an up-sampling process by filling gaps between measured pixels with zeros before propagation.

5. The method of claim 1, further comprising:
decreasing a potential resolution of the reconstructed image to remove noise by:
up-sampling and low-pass filtering the target hologram before propagation by a pre-defined ratio followed by a low-pass filter at a first threshold.

6. The method of claim 5, further comprising:
increasing a potential resolution of the reconstructed image by:
up-sampling and low-pass filtering the target hologram before propagation by a pre-defined ratio followed by a low-pass filter at a second threshold that is greater than the first threshold during propagation.

7. The method of claim 1, further comprising:
based on a reconstruction including a first image and a second image from reconstructing the target hologram and the reference beam hologram according to the one or more reconstruction parameters, wherein the first image and the second image are each out of focus in a respective image plane of the other image:
configuring the de-twinning setting such that the second image is suppressed during hologram reconstruction.

8. The method of claim 1, further comprising:
prior to reconstructing the image, calibrating an optical distortion aberration in an optical system that generates the target hologram and/or the reference beam hologram.

9. The method of claim 1, wherein the calibration comprises:
obtaining, via the user interface, a testing hologram of a fixed frequency transparent fiducial dot-pattern;
reconstructing a testing image from the testing hologram according to the one or more reconstruction parameters; and
iteratively re-generating the testing image based on a progressively adjusted propagation depth parameter received by a depth slider on the user interface until a dot pattern on the testing image comes into focus.

10. A system for reconstructing an image of an object from a hologram of the object, the system comprising:
a user interface that receives a first uploading of a testing hologram of a testing pattern, a second uploading of a target hologram of an object and a selection of a reference beam hologram, and one or more reconstruction parameters including a normalization type configured by a user;
a memory that stores a plurality of processor-executable instructions for image reconstruction from holograms; and
one or more processors that execute the plurality of processor-executable instructions to perform operations comprising:
reconstructing a testing image from the testing hologram according to the one or more reconstruction parameters, wherein the normalization type includes a subtraction division plus mean (SDPM) procedure including subtracting the reference beam hologram from the target hologram and dividing a result from the subtraction by the reference beam hologram plus a mean value of the reference beam hologram;
iteratively re-generating the testing image while adjusting a propagation depth parameter until the testing pattern on the testing image comes within a focus threshold; and
reconstructing an undistorted image of the object from the target hologram and the reference beam hologram according to the one or more reconstruction parameters including the adjusted propagation depth parameter.

11. The system of claim 10, wherein the one or more reconstruction parameters further include any combination of:
a wavelength parameter;
a pixel size parameter;
a magnification parameter;
a propagation mode;
a sinc compensation mode;
a zero padding mode; and
a propagation depth parameter.

12. The system of claim 11, wherein the propagation mode includes at least one of:
angular spectrum;
up-sampling and low-pass filtering;
fast Fourier transforms; or
a combination thereof.

13. The system of claim 12, wherein the up-sampling and low-pass filtering further comprises:
conducting an up-sampling process by filling gaps between measured pixels with zeros and a low pass windowing process in frequency space before propagation.

14. The system of claim 10, wherein the operations further comprise:
configuring a de-twinning setting that includes iteratively updating a complex-valued wavefront in a detector plane during reconstruction.

15. A non-transitory processor-readable storage medium storing a plurality of processor-executable instructions for reconstructing an image of an object from a hologram of the object, the instructions being executable by a processor to perform operations comprising:
receiving, via a user interface, one or more reconstruction parameters configured by a user;
calibrating the one or more reconstruction parameters with a testing hologram until a resulting testing image comes within a focus threshold;
obtaining, via a user interface, a target hologram of an object and a selection of a reference beam hologram; and
reconstructing the image of the object from the target hologram and the reference beam hologram according to the one or more calibrated reconstruction parameters and a de-twinning setting that suppresses a virtual image in reconstruction wherein the one or more reconstruction parameters includes a subtraction division plus mean (SDPM) procedure conducted by:
subtracting the reference beam hologram from the target hologram; and
dividing a result from the subtraction by the reference beam hologram plus a mean value of the reference beam hologram.

16. The non-transitory processor-readable storage medium of claim 15, wherein the one or more reconstruction parameters further include any combination of:
- a wavelength parameter;
- a pixel size parameter;
- a magnification parameter;
- a propagation mode;
- a sinc compensation mode;
- a zero padding mode; and
- a propagation depth parameter.

17. The non-transitory processor-readable storage medium of claim 16, wherein the propagation mode includes at least one of:
- angular spectrum;
- up-sampling and low-pass filtering;
- fast Fourier transforms; or
- any combination thereof.

18. The non-transitory processor-readable storage medium of claim 17, wherein the up-sampling and low-pass filtering further comprises:
- conducting an up-sampling process by filling gaps between measured pixels with zeros before propagation.

19. The non-transitory processor-readable storage medium of claim 15, wherein the operations further comprise:
- decreasing a potential resolution of the reconstructed image to remove noise by:
- up-sampling and low-pass filtering the target hologram before propagation by a pre-defined ratio followed by a low-pass filter at a first threshold.

20. The non-transitory processor-readable storage medium of claim 15, wherein the operations further comprise:
- prior to reconstructing the image, calibrating an optical distortion aberration in an optical system that generates the target hologram and/or the reference beam hologram, wherein the calibration comprises:
  - obtaining, via the user interface, a testing hologram of a fixed frequency transparent fiducial dot-pattern;
  - reconstructing a testing image from the testing hologram according to the one or more reconstruction parameters; and
  - iteratively re-generating the testing image based on a progressively adjusted propagation depth parameter received by a depth slider on the user interface until a dot pattern on the testing image comes into focus.

* * * * *